US006424349B1

(12) United States Patent
Kim

(10) Patent No.: US 6,424,349 B1
(45) Date of Patent: Jul. 23, 2002

(54) DATA CONTROLLER WITH A DATA CONVERTER FOR DISPLAY PANEL

(75) Inventor: Kyu-Tae Kim, Kyungki-Do (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/241,439

(22) Filed: Feb. 2, 1999

(30) Foreign Application Priority Data

Apr. 9, 1998 (KR) .......................................... 98-12604

(51) Int. Cl.[7] .......................... G06F 13/16; G09G 3/04

(52) U.S. Cl. ........................ 345/531; 345/539; 345/42; 345/63

(58) Field of Search ............................ 345/41, 42, 60, 345/63, 89, 77, 600, 539, 531

(56) References Cited

U.S. PATENT DOCUMENTS

| | | | | | |
|---|---|---|---|---|---|
| 5,420,602 | A | | 5/1995 | Kanazawa | 345/67 |
| 6,018,598 | A | * | 1/2000 | Moriwake et al. | 382/270 |
| 6,057,809 | A | * | 5/2000 | Singhal et al. | 345/3.3 |
| 6,088,009 | A | * | 7/2000 | Moon | 345/60 |
| 6,151,001 | A | * | 11/2000 | Anderson et al. | 345/63 |
| 6,208,325 | B1 | * | 3/2001 | Reddy et al. | 345/656 |
| 6,219,040 | B1 | * | 4/2001 | Kotha et al. | 345/211 |
| 6,249,265 | B1 | * | 6/2001 | Tanima et al. | 345/63 |

* cited by examiner

*Primary Examiner*—Ulka J. Chauhan
(74) *Attorney, Agent, or Firm*—Morgan, Lewis & Bockius LLP

(57) ABSTRACT

A data controller for a display panel includes a first memory for storing video data, a second memory for storing next video data, a control unit for controlling the first memory and the second memory for one of storing and outputting the video data stored in at least one of the first and second memories, and a data converter for converting the video data outputted from the at least one of first and second memories to pulse stream data.

7 Claims, 3 Drawing Sheets

DATA CONTROLLER WITH A DATA CONVERTER FOR DISPLAY PANEL

This application claims the benefit of Korean patent application No. 12604/1998 filed Apr. 9, 1998, which is hereby incorporated by reference.

BACKGROUND OF THE INVENTION

1. Field of the Invention

The present invention is directed to a data controller for a display panel, and more particularly, to an improved data controller for a display panel that converts inputted video data to pulse stream data and outputs the pulse stream data to a plasma display panel driver.

2. Discussion of the Related Art

In order to display a gray scale video on a display device, such as a plasma display panel, video data must be outputted by a data controller as bit frame data. For example, 8-bit video data is divided into a total of 8 frames. Then, the 8 frames, that is, 8-bit frame data, 7-bit frame data, 6-bit frame data, 5-bit frame data, 4-bit frame data, 3-bit frame data, 2-bit frame data, and 1-bit frame data, must be inputted to the plasma display panel by the data controller.

However, the video data (R, G, B) inputted from an external system (not illustrated) are inputted in pixel units (pixel format), and thus the plasma display panel driver requires a data controller for converting the video data from the pixel format to the bit frame data format.

FIG. 1 illustrates a related art data controller. As shown in FIG. 1, the related art data controller includes a first memory 10 for storing inputted video data, a second memory 20 for storing next inputted data, and a control unit 30 for controlling the first and second memories 10, 20 to either store the video data or output the previously stored video data.

The operation of the related art data controller will now be described with reference to FIG. 1.

Pursuant to an inputted first clock signal CLK, the control unit 30 outputs a second clock signal CLK' and respective control signals I/01, I/02 to the first memory 10 and the second memory 20.

Then, the first memory 10 and the second memory 20 are synchronized by the second clock signal CLK' and either store the inputted video data or output the previously stored video data in accordance with the control signals I/01, I/02, respectively.

The first memory 10 and the second memory 20 are alternately operated. That is, pursuant to the control signals I/01, I/02, the first memory 10 stores the video data, and at the same time the second memory 20 outputs the video data. Therefore, the first memory 10 and the second memory 20 convert the inputted video data from the pixel format to the bit frame data format, and output the video data in response to commands from the control unit 30.

The bit frame data outputted from the first and second memories 10, 20 are inputted to the plasma display panel. Then, as illustrated in FIG. 2, the bit frame data is displayed in different sections and represents a gray scale.

At this time, sustain-discharge periods (A, B, C, D, E, F, G, H) are an 8th bit sustain-discharge period, a 7th sustain-discharge period, a 6th sustain-discharge period, a 5th sustain-discharge period, a 4th sustain-discharge period, a 3rd sustain-discharge period, a 2nd sustain-discharge period and a 1st sustain-discharge period. The ratio of the sustain-discharge periods (A, B, C, D, E, F, G, H) are 128:64:32:16:8:4:2:1. Addressing periods (I, J, K, L, M, N, O, P) mean bit frames 8 (MSB or most significant bit), 7, 6, 5, 4, 3, 2, 1 (LSB or least significant bit) respectively.

In the related art data controller, when the inputted data has 8 bits, the length of the sustain-discharge period for the most significant bit (MSB) is equal to the sum of the sustain-discharge periods for the other bits as shown in FIG. 2. Also, a half of the frame is turned on, and the other half is turned off. In addition, when data such as 127, 128, 127, . . . are sequentially inputted to one pixel, the bit frame data outputted from a data conversion unit are represented on the time axis, as illustrated in FIG. 3.

Here, video data '127' and '128' become '01111111' and '10000000', . . . respectively, in binary. The bit frame data (Q, R, S) shown in FIG. 3 are '127', '128' and '127' represented in binary form.

When a plurality of bit frames are thus displayed, although a 60 Hz video is displayed, a noticeable flicker results as if 30 Hz video is displaced. In other words, a flicker for a continually displayed specific color is noticeable to a user.

SUMMARY OF THE INVENTION

Accordingly, the present invention is directed to a data controller for a display panel that substantially obviates one or more of the problems due to limitations and disadvantages of the related art.

An object of the present invention is to provide an improved data controller for a display panel that prevents flicker for a specific color and displays a gray scale with a simple on/off function.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a data controller for a display panel including a first memory for storing video data, a second memory for storing next video data, a control unit for controlling the first memory and the second memory for one of storing and outputting the video data stored in at least one of the first and second memories, and a data converter for converting the video data outputted from the at least one of first and second memories to pulse stream data.

In another aspect of the present invention there is provided a data controller for a display panel including a first memory for storing video data, a second memory for storing next video data, a control unit for controlling the first memory and the second memory for one of storing and outputting the video data stored in at least one of the first and second memories, and a data converter for converting the video data outputted from the at least one of the first and second memories to pulse stream data, wherein the data converter includes a random number generator for generating random number signals in response to a clock signal outputted from the control unit, and first, second and third comparators for comparing the random number signals and the video data outputted from the at least one of the first memory and the second memory, and outputting the pulse stream data, wherein each of the first, second and third comparators are multiple bit comparators, wherein the random number signals are applied to plus terminals of the first, second and third comparators, wherein the video data output from the at least one of the first memory and the second memory is applied to minus terminals of the first, second and third comparators, and wherein the data converter and the control unit are integrally formed.

In another aspect of the present invention there is provided a data controller for a display panel including a first memory for storing video data, a second memory for storing next video data, a control unit for controlling the first memory and the second memory for one of storing and outputting the video data stored in at least one of the first and second memories, and a data converter for converting the video data outputted from the at least one of the first and second memories to pulse stream data, wherein the data converter includes a random number generator for generating random number signals in response to a clock signal outputted from the control unit, and first, second and third comparators for comparing the random number signals and the video data outputted from the at least one of the first memory and the second memory, and outputting the pulse stream data, wherein each of the first, second and third comparators are multiple bit comparators, wherein the random number signals are applied to plus terminals of the first, second and third comparators, wherein the video data output from the at least one of the first memory and the second memory is applied to minus terminals of the first, second and third comparators, and wherein the data converter and the control unit are separately formed.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
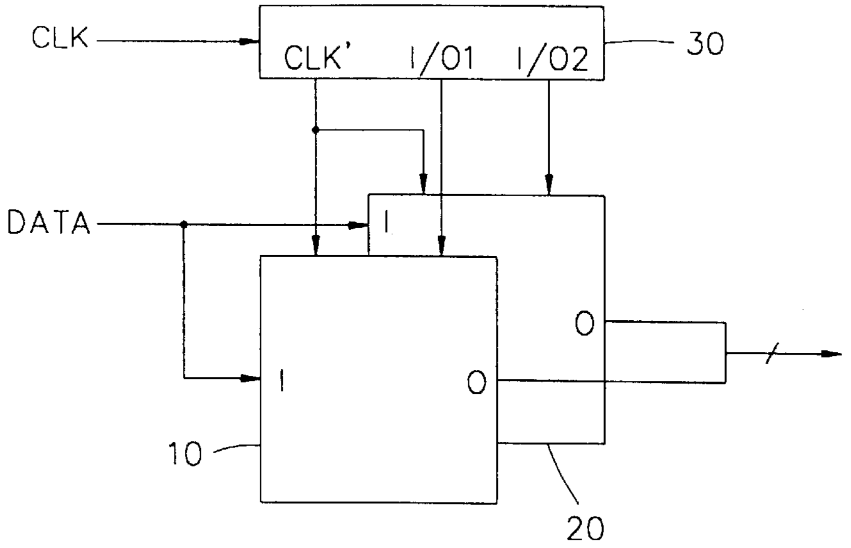
FIG. 1 RELATED ART
FIG. 1 is a block diagram illustrating a conventional data controller for a display panel.
Figure 2:
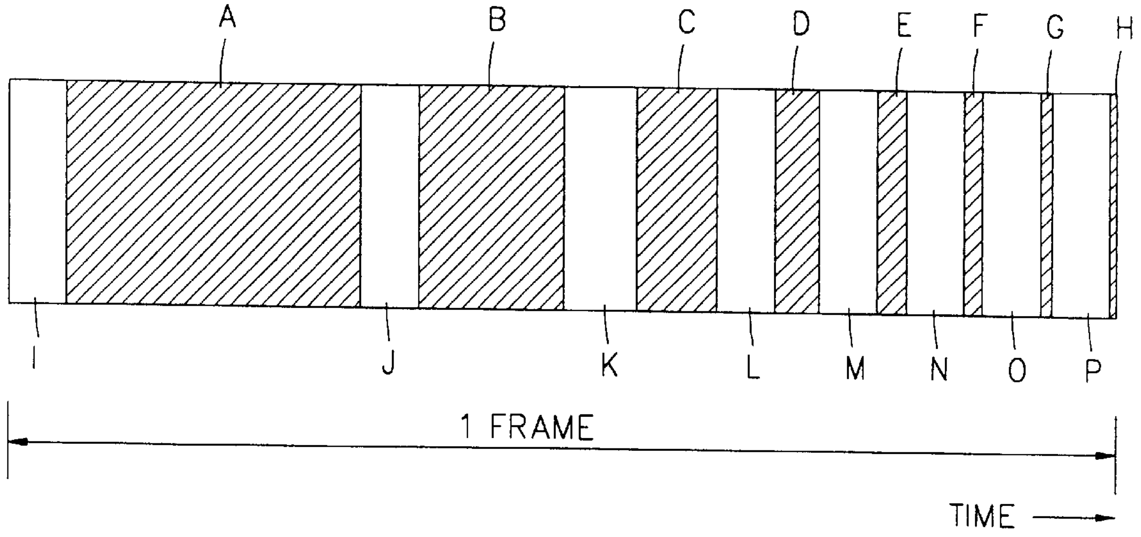
FIG. 2 RELATED ART
FIG. 2 illustrates a status of data displayed by the conventional data controller in FIG. 1.
Figure 3:
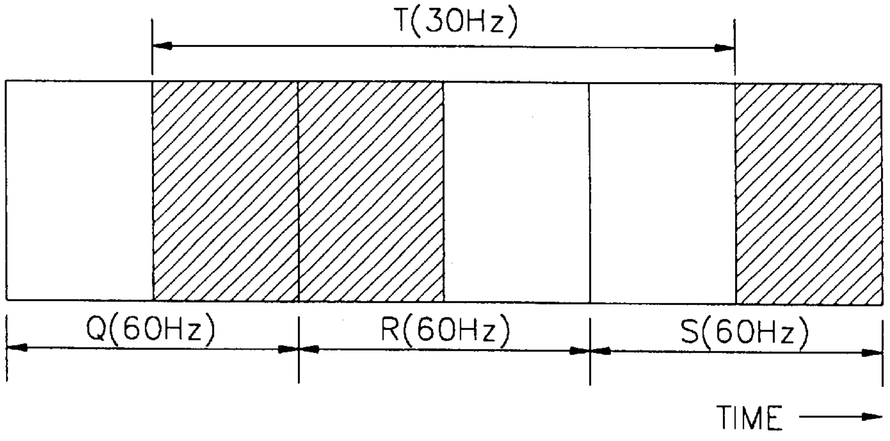
FIG. 3 RELATED ART
FIG. 3 illustrates a case where similar numbers are sequentially inputted for the data displayed as in FIG. 2.
Figure 4:
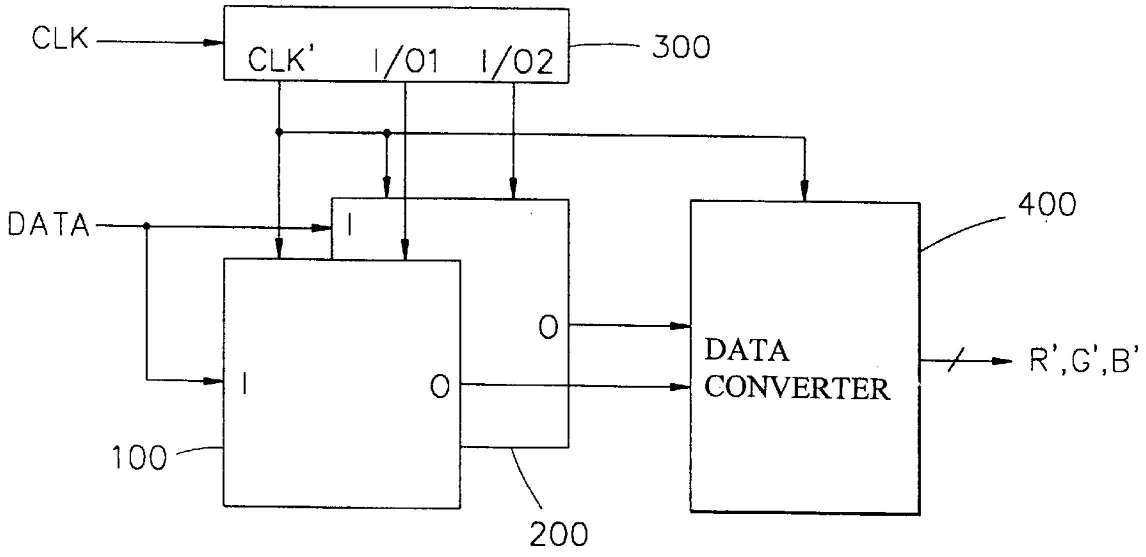
FIG. 4 is a block diagram illustrating a data controller for a display panel in accordance with the present invention.

As illustrated in FIG. 4, the data controller for a display panel of the present invention includes a first memory 100 for storing inputted R, G, B data; a second memory 200 for storing next (succeeding) R, G, B data; a control unit 300 for controlling the first and second memories 100, 200 for either storing or outputting the stored R, G, B data; and a data converter 400 for converting the R, G, B data outputted from the first and second memories 100, 200 to pulse stream data.

The data converter 400 includes a random number generator 410 for generating random number signals pursuant to a second clock signal CLK' outputted from the control unit 300, and first, second and third comparators 420, 430, 440 for comparing and outputting R', G', B' data. The random number signals generated from the random number generator 410 are applied to plus terminals of the comparators 420, 430, 440, and the R, G, B data outputted from the first memory 100 or the second memory 200 are applied to minus terminals of the comparators 420, 430, 440, respectively. The first, second and third comparators 420, 430, 440 are multi-bit comparison units.

The operation of the data controller of the present invention will now be explained. As illustrated in FIG. 4, responsive to the first clock signal CLK, the control unit 300 outputs the second clock signal CLK' and respective control signals I/01, I/02 to the first memory 100 and the second memory 200. Then, the first memory 100 and the second memory 200 are synchronized to the second clock signal CLK' and store the externally supplied video data (R, G, B) or output the previously stored video data (R, G, B) in accordance to the respective control signals I/01, I/02.

The first memory 100 and the second memory 200 are alternately operated. In other words, according to the control signals (I/01, I/02) outputted from the control unit 300, when the first memory 100 carries out a "store" operation of the video data (R, G, B), the second memory 200 outputs the video data (R, G, B). Accordingly, under the control of the control unit 300, the first and second memories 100, 200 store the inputted data (R, G, B) in pixel form and output the inputted data (R, G, B) to the data converter 400. Then, the data converter 400 converts the video data (R, G, B) outputted from the first memory 100 and the second memory 200 to pulse stream data, and outputs the converted pulse stream data.

Figure 5:
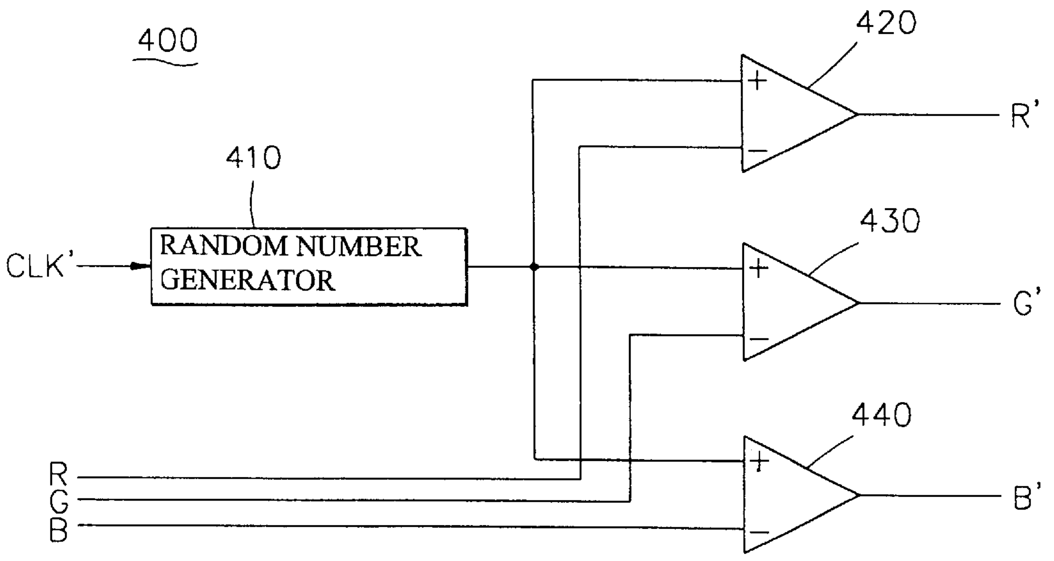
FIG. 5 is a block diagram illustrating a data converter of the data controller in FIG. 4.

The internal operation of the data converter 400 will now be described in detail with reference to FIG. 5. The random number generator 410 generates random number signals in response to the second clock signal CLK' outputted from the control unit 300. The first, second and third comparators 420, 430, 440 compare the video data (R, G, B) inputted from the first memory 100 or the second memory 200 with the random number signals outputted from the random number generator 410, and output new data signals (R', G', B'). When the value of an inputted random number signal is greater than the video data (R, G, B), the new data signals (R', G', B') outputted from the first to third comparison units 420, 430, 440 are outputted as '1'. When the value of the random number signal is less than the video data (R, G, B), the new data signals (R', G', B') are outputted as '0'.

The characteristics of the random number generator 410 will now be described. When a predetermined number is determined as a reference value and the generated random numbers are compared with the predetermined number, the probability that the generated random number is larger than the predetermined reference value is represented by (reference value/the largest value of the random numbers). In addition, in case the random numbers are lengthy, the probability may be represented by equation (number of random numbers being 1/length of the total random numbers). A more accurate probability may be determined with the random numbers having a greater length.

Further, the number of the comparators 420, 430, 440 is dependent on users. The random number signals outputted from the random number generator 410 are composed of multiple bits, divided by a number of the comparators, and inputted to the comparators.

The R', G', B' data outputted from the first, second and third comparators units 420, 430, 440 are combined and become the pulse stream data without weighting, and are inputted to a plasma display panel (not illustrated).

Figure 6:
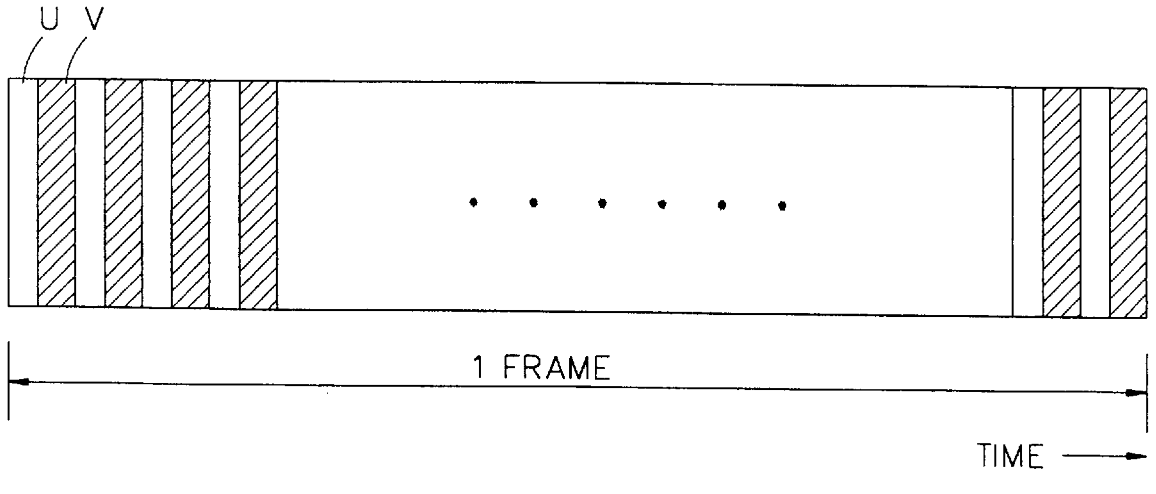
FIG. 6 illustrates a status of a data displayed in the data controller in FIG. 4.

Therefore, the plasma display panel creates a predetermined number of on/off conditions according to the number of pulse stream data. As illustrated in FIG. 6, an addressing period U and a sustain period V are alternately shown, and thus flicker does not occur.

Further, the data converter 400 can be a separate unit, or can be part of the control unit 300.

As described, the data controller for a display panel according to the present invention prevents flicker for a specific color and represents a gray scale by a black and white display driving method.

While the invention has been described in detail and with reference to specific embodiments thereof, it will be apparent to those skilled in the art that various changes and modifications can be made therein without departing from the spirit and scope thereof Thus, it is intended that the present invention cover the modifications and variations of this invention provided they come within the scope of the appended claims and their equivalents.

What is claimed is:

1. A data controller for a display panel comprising:

a first memory for storing video data;

a second memory for storing next video data;

a control unit for controlling the first memory and the second memory for one of storing and outputting the video data stored in at least one of the first and second memories; and a data converter for converting the video data outputted from the at least one of the first and second memories to pulse stream data, wherein the data converter includes:

a random number generator for generating random number signals in response to a clock signal outputted from the control unit; and first, second and third comparators for comparing the random number signals and the video data outputted from the at least one of the first memory and the second memory, and outputting the pulse stream data.

2. The device of claim 1, wherein each of the first, second and third comparators are multiple bit comparators.

3. The device of claim 1, wherein the random number signals are applied to plus terminals of the first, second and third comparators, and wherein the video data output from the at least one of the first memory and the second memory is applied to minus terminals of the first, second and third comparators.

4. The device of claim 1, wherein the data converter and the control unit are integrally formed.

5. The device of claim 1, wherein the data converter and the control unit are separately formed.

6. A data controller for a display panel comprising:

a first memory for storing video data;

a second memory for storing next video data;

a control unit for controlling the first memory and the second memory for one of storing and outputting the video data stored in at least one of the first and second memories; and a data converter for converting the video data outputted from the at least one of the first and second memories to pulse stream data, wherein the data converter includes:

a random number generator for generating random number signals in response to a clock signal outputted from the control unit; and first, second and third comparators for comparing the random number signals and the video data outputted from the at least one of the first memory and the second memory, and outputting the pulse stream data, wherein each of the first, second and third comparators are multiple bit comparators, wherein the random number signals are applied to plus terminals of the first, second and third comparators, wherein the video data output from the at least one of the first memory and the second memory is applied to minus terminals of the first, second and third comparators, and wherein the data converter and the control unit are integrally formed.

7. A data controller for a display panel comprising:

a first memory for storing video data;

a second memory for storing next video data;

a control unit for controlling the first memory and the second memory for one of storing and outputting the video data stored in at least one of the first and second memories; and a data converter for converting the video data outputted from the at least one of the first and second memories to pulse stream data, wherein the data converter includes:

a random number generator for generating random number signals in response to a clock signal outputted from the control unit; and first, second and third comparators for comparing the random number signals and the video data outputted from the at least one of the first memory and the second memory, and outputting the pulse stream data, wherein each of the first, second and third comparators are multiple bit comparators, wherein the random number signals are applied to plus terminals of the first, second and third comparators, wherein the video data output from the at least one of the first memory and the second memory is applied to minus terminals of the first, second and third comparators, and wherein the data converter and the control unit are separately formed.

* * * * *